2,792,280

VISCOSE COMPOSITION AND METHOD OF SPINNING

Byron A. Thumm, Prospect Park, and Marion R. Lytton, West Chester, Pa., and John A. Howsmon, Wilmington, Del., assignors to American Viscose Corporation, Philadelphia, Pa., a corporation of Delaware No Drawing. Application September 21, 1953, Serial No. 381,465

19 Claims. (Cl. 18—54)

This invention relates to the production of shaped bodies of regenerated cellulose from viscose.

In the conventional method of producing shaped bodies of regenerated cellulose from viscose, a suitable cellulosic material such as purified cotton linters, wood pulp, mixtures thereof, and the like is first converted to an alkali cellulose by treatment with a caustic soda solution and after shredding the treated cellulose material, it is allowed to age. The aged alkali cellulose is then converted to a xanthate by treatment with carbon disulfide. The cellulose xanthate is subsequently dissolved in a caustic soda solution in an amount calculated to provide a viscose of the desired cellulose and alkali content. After filtration, the viscose solution is allowed to ripen and is subsequently extruded through a shaped orifice into a suitable coagulating and regenerating bath.

In the production of filaments, the viscose solution is extruded through a spinneret into a coagulating and regenerating bath consisting of an aqueous acid solution containing zinc sulfate. The filament may subsequently be passed through a hot aqueous bath where it is stretched to improve its properties such as tensile strength. The filament may then be passed through a dilute aqueous solution of sulfuric acid and sodium sulfate to complete the regeneration of the cellulose, in case it is not completely regenerated upon leaving the stretching stage. The filament is subsequently subjected to washing, purification, bleaching, possibly other treating operations and drying, being collected either before or after these treatments.

The filaments as formed by the conventional methods, consist of a skin or outer shell portion and a core portion with a sharp line of demarkation between the two. The cross-section of the filaments exhibits a very irregular or crenulated exterior surface. The skin and core portions of the filament represent differences in crystal structure and the different portions possess different swelling and staining characteristics. The sharply irregular and crenulated surface structure has a relatively low abrasion resistance and readily picks up foreign particles such as dirt.

It has now been discovered that the incorporation of small amounts of a lower alkylol derivative of pyridine, the alkylol group containing not more than four carbon atoms, in viscose results in the production of regenerated cellulosic shaped bodies such as filaments, films, sheets and the like having improved properties and characteristics. The most readily distinguishable characteristics as compared to conventional filaments include a smooth, non-crenulated surface and the filaments consist entirely of skin. This invention contemplates the use of mono-, di- and tri-methylol, mono-, di- and tri-ethylol, mono-, di- and tri-propylol and mono-, di- and tri-butylol derivatives of pyridine and mixtures of two or more derivatives; for example, 2-ethylol pyridine, 4-ethylol pyridine, 2-propylol pyridine, 4-propylol pyridine, 2,4-di-ethylol pyridine, 2,4-dipropyl pyridine, 2,4,6-triethylol pyridine and the like.

The pyridine derivative may be added at any desired stage in the production of the viscose, preferably being added after the cellulose xanthate has been dissolved in the caustic solution. The amount of the pyridine derivative added to and incorporated in the viscose should be at least about 0.1 mole per 100 kgs. of viscose and may vary over a wide range, namely, from about 0.1 to about 10 and even up to 20 or more moles per 100 kgs. of viscose. I prefer to incorporate in the viscose an amount of from about 0.2 to about 5 moles per 100 kgs. of viscose. Amounts within the preferred range are effective, however, lesser or greater amounts do not adversely affect the properties and characteristics of the products.

Regenerated cellulose filaments prepared from viscose containing the small amounts of pyridine derivatives have a smooth or non-crenulated surface and consist substantially entirely of skin. Because of the uniformity of crystal structure throughout the filament, the swelling and staining characteristics are uniform throughout the cross-section of the filament. Filaments produced pursuant to this invention and consisting entirely of skin have a high toughness and a greater flexing life which may be attributed by the uniformity in skin structure throughout the filament. Although the twisting of conventional filaments, as in the production of tire cord, results in an appreciable loss of tensile strength, there is little loss in tensile strength in the production of cords from the filaments consisting entirely of skin. Filaments prepared from viscose containing the pyridine derivatives have a high tensile strength as compared to normal regenerated cellulose filaments and have superior abrasion and fatigue resistance characteristics. Such filaments are highly satisfactory for the production of cords for the reinforcement of rubber products such as pneumatic tire casings, but the filaments are not restricted to such uses and may be used for other textile applications.

The invention may be illustrated by reference to the preparation of regenerated cellulose filaments from a viscose containing 7% cellulose, 6% caustic soda, and having a total carbon disulfide content of about 41%. The viscose solutions were prepared by xanthating alkali cellulose by the introduction of 36% carbon disulfide and churning for about 2½ hours. The cellulose xanthate was then dissolved in caustic soda solution. An additional 5% carbon disulfide was then added and the mass again churned for about one hour. The pyridine derivative was added to the caustic soda solution and mixed for about ½ hour. The viscose was then allowed to ripen for about 40 hours at 18° C.

Representative alkylol derivatives of pyridine and mixtures of specific derivatives were added in different amounts to various lots of viscose having the foregoing composition and prepared as described. Each viscose lot containing a derivative of pyridine was extruded through a spinneret into an acidic spinning bath to form a 250 denier, 120 filament yarn at a rate of about 10 meters per minute. The yarn was passed over a godet from which it was conducted through a hot water bath. During the travel through the hot water bath the yarn was stretched. The yarn was then passed through a bath containing about 3% sulfuric acid and about 5% sodium sulfate to complete the regeneration of the cellulose. The yarn was then collected in a spinning box, washed free of acid and salts and dried. Control lots of viscose containing no pyridine derivative were also spun in the same manner and under the same conditions.

Representative derivatives incorporated in the viscose lots, the amounts added, the salt test of the viscose lots, the compositions of the spinning baths and the conditions of spinning are set forth in the following table:

Table

|  | 2-Ethylol pyridine | | 2-Propylol pyridine | | 4-Propylol pyridine | 2-Propylol pyridine and 4-Propylol pyridine |
|---|---|---|---|---|---|---|
| Percent Added | 0.123 | 0.246 | 0.137 | 0.28 | 0.137 | 0.02 of each. |
| Moles/100 kgs. viscose | 1 | 2 | 1 | 2 | 1 | 0.15 of each. |
| Salt test | 9.4 | 10.2 | 9.7 | 9.7 | 9.3 | 8.4. |
| Spinning Bath: | | | | | | |
| Percent H$_2$SO$_4$ | 7.6 | 7.2 | 7.0 | 6.4 | 7.2 | 8.25. |
| Percent Zn SO$_4$ | 7.8 | 7.6 | 8.0 | 7.5 | 3.4 | 8.7. |
| Percent Na$_2$SO$_4$ | 20 | 18 | 19 | 17 | 24 | 21. |
| Temp. °C | 53 | 60 | 55 | 53 | 57 | 54. |
| Water bath temp. °C | 90 | 90 | 86 | 92 | 95 | 90. |
| Final bath temp. °C | 50 | 70 | 45 | 62 | 50 | 57. |
| Percent Stretch | 90 | 110 | 90 | 120 | 104 | 90. |

The individual filaments spun from the viscose lots containing the pyridine derivatives have a smooth non-crenulated exterior surface and consist entirely of skin, no core being detectable at high magnification. The filaments of the control yarns spun with the same viscose lots but without the addition of the pyridine derivatives and spun under the same conditions, exhibit a very irregular and crenulated surface and are composed of a skin portion and a core portion with a sharp line of demarkation between the skin and core.

If desired, small amounts of the pyridine derivatives may be added to the spinning bath. Since these derivatives are water-soluble, some of the derivative will be leached from the filament and will be present in the bath.

The alkylol derivatives as defined hereinbefore may be added to any desired viscose such as those normally used in industry, the specific viscose composition set forth above, being merely for illustrative purposes.

The viscose may contain from about 6% to about 10% cellulose, the particular source of the cellulose being selected for the ultimate use of the regenerated cellulose product. The caustic soda content may be from about 4% to about 8% and the carbon disulfide content may be from about 30% to about 50% based upon the weight of the cellulose. The modified viscose, that is, a viscose containing the small amount of a pyridine derivative may have a salt test above about 5 and preferably above about 7 at the time of spinning or extrusion.

The composition of the spinning bath may be varied over a considerable range and the presence of the pyridine derivatives in the viscose permits the production of yarns having improved properties such as high tenacity, high abrasion resistance and high fatigue resistance with spinning baths having a relatively low zinc content. The spinning bath may contain from about 5% to about 12% sulfuric acid, from about 15% to about 25% sodium sulfate and from about 1% to about 10% zinc sulfate. Other metal sulfates such as iron, manganese, nickel and the like may be present and may replace some of the zinc sulfate. The temperature of the spinning bath may be from about 40° C. to about 75° C.

In the production of filaments for such purposes as the fabrication of tire cord, the filaments are preferably stretched after removal from the initial coagulating and regenerating bath. From the initial spinning bath, the filaments may be passed through a hot aqueous bath which may consist of hot water or a dilute acid solution and may be stretched from about 80% to about 120%, preferably between 90% and 100%. Yarns for other textile purposes may be stretched about 20% or more. The precise amount of stretching will be dependent upon the desired tenacity and other properties and the specific type of product being produced. It is to be understood that the invention is not restricted to the production of filaments and yarns but is also applicable to other shaped bodies such as sheets, films, tubes and the like. The filaments may then be passed through a final regenerating bath which may contain from about 1% to about 5% sulfuric acid and from about 1% to about 5% sodium sulfate with or without small amounts of zinc sulfate.

The treatment following the final regenerating bath, or the stretching operation where regeneration has been completed, may consist of a washing step, the application of a finishing or plasticizing material and drying before or after collecting, or may include other steps such as bleaching and the like. The treatment after regeneration will be dictated by the specific type of shaped body and the proposed use thereof.

While preferred embodiments of the invention have been disclosed, the description is intended to be illustrative and it is to be understood that changes and variations may be made without departing from the spirit and scope of the invention as defined by the appended claims.

We claim:

1. As a composition of matter, viscose containing a small amount of a lower alkylol derivative of pyridine, the alkylol group containing not more than four carbon atoms.

2. As a composition of matter, viscose containing a small amount of an ethylol derivative of pyridine.

3. As a composition of matter, viscose containing a small amount of a propylol derivative of pyridine.

4. As a composition of matter, viscose containing from about 0.1 mole to about 20 moles of a lower alkylol derivative of pyridine, the alkylol group containing not more than four carbon atoms per 100 kgs. of viscose.

5. As a composition of matter, viscose containing from about 0.2 to about 5 moles of a lower alkylol derivative of pyridine, the alkylol group containing not more than four carbon atoms, per 100 kgs. of viscose.

6. As a composition of matter, viscose comprising from about 6% to about 10% cellulose, from about 4% to about 8% sodium hydroxide, from about 30% to about 50% carbon disulfide based upon the weight of the cellulose and a small amount of a lower alkylol derivative of pyridine, the alkylol group containing not more than four carbon atoms, the amount being based upon the weight of the viscose.

7. In a method of producing shaped bodies of regenerated cellulose from viscose, the step which comprises adding to and incorporating in viscose a small amount of a lower alkylol derivative of pyridine, the alkylol group containing not more than four carbon atoms, the amount being based upon the weight of the viscose.

8. In a method of producing shaped bodies of regenerated cellulose from viscose, the step which comprises adding to and incorporating in viscose a small amount of an ethylol derivative of pyridine, the amount being based upon the weight of the viscose.

9. In a method of producing shaped bodies of regenerated cellulose from viscose, the step which comprises adding to and incorporating in viscose a small amount of a propylol derivative of pyridine, the amount being based upon the weight of the viscose.

10. The method of producing shaped bodies of regenerated cellulose consisting entirely of skin which comprises spinning viscose containing a small amount of a lower alkylol derivative of pyridine, the alkylol group containing not more than four carbon atoms, the amount being based upon the weight of the viscose, into an aqueous acidic spinning bath containing zinc sulfate.

11. The method of producing shaped bodies of regenerated cellulose consisting entirely of skin which comprises spinning viscose containing a small amount of an ethylol derivative of pyridine, the amount being based upon the weight of the viscose, into an aqueous acidic spinning bath containing zinc sulfate.

12. The method of producing shaped bodies of regenerated cellulose consisting entirely of skin which comprises spinning viscose containing a small amount of a propylol derivative of pyridine, the amount being based upon the weight of the viscose, into an aqueous acidic spinning bath containing zinc sulfate.

13. The method of producing shaped bodies of regenerated cellulose consisting entirely of skin which comprises spinning viscose containing from about 0.1 mole to about 20 moles of a lower alkylol derivative of pyridine, the alkylol group containing not more than four carbon atoms, per 100 kgs. of viscose into an aqueous spinning bath containing from about 1% to about 10% zinc sulfate.

14. The method of producing shaped bodies of regenerated cellulose consisting entirely of skin which comprises spinning viscose containing from about 0.2 to about 5 moles of a lower alkylol derivative of pyridine, the alkylol group containing not more than four carbon atoms, per 100 kgs. of viscose into an aqueous spinning bath containing from about 1% to about 10% zinc sulfate.

15. The method of producing shaped bodies of regenerated cellulose consisting entirely of skin which comprises spinning viscos containing a small amount of a lower alkylol derivative of pyridine, the alkylol group containing not more than four carbon atoms, the amount being based upon the weight of the viscose, into an aqueous acidic spinning bath containing from about 1% to about 10% zinc sulfate and stretching the body at least 20%.

16. The method of producing shaped bodies of regenerated cellulose consisting entirely of skin which comprises spinning viscose containing a small amount of a lower alkylol derivative of pyridine, the alkylol group containing not more than four carbon atoms, the amount being based upon the weight of the viscose, into an aqueous acidic spinning bath containing from about 1% to about 10% zinc sulfate and stretching the body between about 80% and about 120%.

17. The method of producing shaped bodies of regenerated cellulose consisting entirely of skin which comprises spinning viscose containing from about 0.1 mole to about 20 moles of a lower alkylol derivative of pyridine, the alkylol group containing not more than four carbon atoms, per 100 kgs. of viscose into an aqueous acidic spinning bath containing from about 1% to about 10% zinc sulfate and stretching the body between about 80% and about 120%.

18. The method of producing shaped bodies of regenerated cellulose consisting entirely of skin which comprises spinning viscose containing from about 0.2 to about 5 moles of a lower alkylol derivative of pyridine, the alkylol group containing not more than four carbon atoms, per 100 kgs. of viscose into an aqueous acidic spinning bath containing from about 1% to about 10% zinc sulfate and stretching the body between about 80% and about 120%.

19. The method of producing shaped bodies of regenerated cellulose consisting entirely of skin which comprises spinning viscose containing a small amount of a lower alkylol derivative of pyridine, the alkylol group containing not more than four carbon atoms, the amount being based upon the weight of the viscose, into an aqueous acidic spinning bath containing sulfuric acid and from about 1% to about 10% zinc sulfate, removing the body from the spinning bath before regeneration of the cellulose has been completed, stretching the partially regenerated cellulose body at least 20% and completing the regeneration of the cellulose.

References Cited in the file of this patent

UNITED STATES PATENTS 2,535,044    Cox _____ Dec. 26, 1950